(12) United States Patent
Boutefeu et al.

(10) Patent No.: US 7,727,448 B2
(45) Date of Patent: Jun. 1, 2010

(54) DENSIFICATION OF FIBROUS STRUCTURES BY RESIN TRANSFER MOULDING FOR MAKING THICK PARTS OF COMPOSITE MATERIAL

(75) Inventors: Brigitte Boutefeu, Le Haillan (FR); Martine Dauchier, Martignas sur Jalles (FR); Marie-Laure Fages, Lacanau de Mios (FR); Jean-Pierre Cauchois, Saint Avold (FR)

(73) Assignee: SNECMA Propulsion Solide, Le Haillan (FR)

( * ) Notice: Subject to any disclaimer, the term of this patent is extended or adjusted under 35 U.S.C. 154(b) by 0 days.

(21) Appl. No.: 11/793,362

(22) PCT Filed: Dec. 16, 2005

(86) PCT No.: PCT/FR2005/051100

§ 371 (c)(1),
(2), (4) Date: Oct. 3, 2007

(87) PCT Pub. No.: WO2006/064167

PCT Pub. Date: Jun. 22, 2006

(65) Prior Publication Data

US 2008/0128938 A1    Jun. 5, 2008

(30) Foreign Application Priority Data

Dec. 16, 2004   (FR)   .................................. 04 13392

(51) Int. Cl.
*B29C 45/14*     (2006.01)
*B29C 45/34*     (2006.01)
*C01B 31/02*     (2006.01)
*B29C 35/00*     (2006.01)
*B32B 3/00*      (2006.01)

(52) U.S. Cl. ...................... 264/257; 264/102; 264/313; 264/511; 425/388
(58) Field of Classification Search ................. 264/257, 264/510, 511, 258, 102, 313, 316, 236; 425/388
See application file for complete search history.

(56) References Cited

U.S. PATENT DOCUMENTS 3,879,245 A  *  4/1975  Fetherston et al. .......... 156/245

(Continued)

FOREIGN PATENT DOCUMENTS

DE       198 53 709 C1       2/2000

(Continued)

OTHER PUBLICATIONS

Van Harten, K. and Nijhof, A.H. J.: "Rsein Transfer Moulding (Eindrapport IOP-PCBP project nr. 5.1)" 1991, Technische Universiteit Delft , Delft , XP002343605 pp. V-2-pp. V-10.

(Continued)

*Primary Examiner*—Joseph S Del Sole
*Assistant Examiner*—Nahida Sultana
(74) *Attorney, Agent, or Firm*—Weingarten, Schurgin, Gagnebin & Lebovici LLP

(57) ABSTRACT

A fiber structure for forming the reinforcement of a part to be made is placed in a mold (22) having at least one wall formed by a flexible membrane, and then a resin composition is injected into the mold, the composition having a volatile material content of less than 25% by weight and being at a temperature of a value such that its viscosity lies in the range 0.1 Pa·s to 0.3 Pa·s. The resin is polymerized in the mold placed in an enclosure (20) with temperature being raised progressively and with polymerization including at least a final stage of polymerization under pressure in order to obtain a composite material part presenting residual porosity of less than 11% by volume.

13 Claims, 3 Drawing Sheets

U.S. PATENT DOCUMENTS

| | | | |
|---|---|---|---|
| 3,975,479 A | | 8/1976 | McClean |
| 4,201,823 A | * | 5/1980 | Russell ....................... 428/194 |
| 4,683,099 A | * | 7/1987 | Buxton et al. ............... 264/511 |
| 4,942,013 A | * | 7/1990 | Palmer et al. ............... 264/511 |
| 5,686,038 A | * | 11/1997 | Christensen et al. ........ 264/257 |
| 5,942,182 A | * | 8/1999 | Hoge et al. .................. 264/510 |
| 6,001,300 A | | 12/1999 | Buckley ....................... 264/447 |
| 6,325,608 B1 | * | 12/2001 | Shivakumar et al. ..... 425/129.1 |
| 6,896,841 B2 | * | 5/2005 | Velicki et al. ............... 264/510 |
| 7,160,498 B2 | * | 1/2007 | Mataya ........................ 264/510 |
| 7,226,559 B2 | * | 6/2007 | Maxwell et al. ............. 264/511 |
| 7,413,694 B2 | * | 8/2008 | Waldrop et al. ............. 264/257 |
| 7,419,627 B2 | * | 9/2008 | Sheu et al. ................... 264/257 |
| 2003/0111752 A1 | * | 6/2003 | Wood et al. ................. 264/29.1 |
| 2003/0227107 A1 | * | 12/2003 | Stewart ....................... 264/236 |
| 2004/0012118 A1 | * | 1/2004 | Perez et al. .................. 264/257 |
| 2004/0046291 A1 | * | 3/2004 | Johnson et al. ............. 264/510 |

FOREIGN PATENT DOCUMENTS

| | | | |
|---|---|---|---|
| DE | 19853709 C1 | * | 2/2000 |
| FR | 2 771 960 A | | 6/1999 |
| JP | 04-339608 | * | 11/1992 |

OTHER PUBLICATIONS

Afendi, M. et al.: "Bubble free resin for infusion process" Jun. 2005, Composites Part A: Applied Science and Manufacturing, Elsevier Science Publishers B.V., Amsterdam, NL, pp. 739-746 , XP004812790 ISSN: 1359-835X p. 739-p. 746.

"Abron PR100(SL)" [Online] XP002343595 Retrieved from the Internet: URL:http://www.abrorganics.com/abronPR100SL.htm> [retrieved on Sep. 6, 2005] p. 1-p. 1.

* cited by examiner

DENSIFICATION OF FIBROUS STRUCTURES BY RESIN TRANSFER MOULDING FOR MAKING THICK PARTS OF COMPOSITE MATERIAL

This application is a §371 national phase filing of PCT/FR2005/051100 filed Dec. 16, 2005, and claims priority to French application No. 04 13392 filed Dec. 16, 2004.

BACKGROUND OF THE INVENTION

The invention relates to making composite material parts with fiber reinforcement and a resin matrix by using a method of injecting resin under pressure also referred to as resin transfer molding (RTM).

The field of application of the invention is more particularly that of making thick parts out of composite material. As examples of such parts, mention can be made of the diverging portions of rocket engine nozzles such as those made of composite material having carbon fiber reinforcement and a phenolic resin matrix. Naturally, the invention is applicable to fabricating a wide variety of parts, whether parts for rocket engines or airplane engines, or parts suitable for use more generally in the fields of aviation and space, or in other fields.

A technique commonly used for making thick parts of composite material consists in using a resin to pre-impregnate layers or strips of woven fabric or other fiber textures, in draping or winding the pre-impregnated layers or strips on a shaper and a mandrel until a desired thickness is obtained, then covering the resulting blank in a delamination film, a resin drain fabric, and an elastomer membrane in order to allow the resin to be polymerized in an autoclave and thus obtain a part having substantially the desired shape.

Such a method makes it possible to achieve technical results that are satisfactory for certain potential applications, i.e. low residual porosity and a reinforcing fiber fraction that is quite high. Nevertheless, implementing that method industrially presents drawbacks: resin impregnation and polymerization within an autoclave after draping or winding are implemented as a plurality of successive steps. The operation of impregnation by passing through baths implies using solvents and requires special treatment of effluents since they present problems in terms of the environment, hygiene, and safety.

The RTM method has also been known for a long time and it is in widespread use, enabling the steps of impregnating a fiber reinforcement in a mold by injecting resin to be followed immediately by polymerization in an autoclave without the impregnated fiber reinforcement being left in open air.

Nevertheless, if a conventional RTM method is implemented on fiber reinforcement of great thickness, it is difficult to obtain composite material parts presenting little residual porosity. In order to be able to impregnate thick fiber reinforcement right through to the core it is necessary for the resin to present low viscosity. Lowering viscosity by using solvents, and using resins that give off volatile materials during polymerization, as applies in particular for phenolic resins, mean that a high level of residual porosity is present in the composite material after the resin has been polymerized. It is indeed possible to reduce porosity by repeating the impregnation and polymerization cycle several times, but only with significantly increased durations and processing costs.

OBJECT AND SUMMARY OF THE INVENTION

An object of the invention is to provide a method of making composite material parts with fiber reinforcement and a resin matrix, suitable for obtaining parts that are thick, with low porosity, and without presenting the above-mentioned drawbacks of prior art methods using pre-impregnated reinforcement or a conventional RTM process.

This object is achieved by a method of making a thick part of composite material having fiber reinforcement and a resin matrix, the method comprising the steps of:

providing a fiber structure that is to form the reinforcement of the part to be made;

placing the fiber structure in a mold having at least one wall that is formed by a flexible membrane;

injecting into the mold a resin composition having a volatile material content of less than 25% by weight and at a temperature of a value such that its viscosity lies in the range 0.1 pascal seconds (Pa·s) to 0.3 Pa·s; and polymerizing the resin in the mold placed in an enclosure with temperature being raised progressively, the polymerization step including at least a final stage of polymerization under pressure in order to obtain a composite material part presenting residual porosity of less than 11% by volume.

The term "thick" part is used herein to mean a part possessing thickness of at least 5 centimeters (cm).

The fiber structure may be of the one-dimensional type (1D), e.g. formed by winding a yarn or a tow, of the two-dimensional type (2D), e.g. formed by draping fiber plies, or of the three-dimensional type (3D), e.g. formed by 3D weaving, braiding, or knitting, or by superposing fiber plies and bonding them to one another.

Fiber plies can be bonded to one another "mechanically" by means of elements extending through the plies. This can be done by needling with fibers being moved out from the planes of the plies, or by implanting yarns or rigid elements (needles or rods) through the plies, or else by stitching. The fiber structure then constitutes a preform for the part that is to be made, which preform can be manipulated while it conserves its cohesion, however it is not rigid.

In a variant, fiber plies constituting a 3D fiber structure can be bonded to one another by means of a bonding agent such as an organic or an inorganic binder that serves not only to bond the plies together, but also to stiffen the fiber structure.

It should be observed that with 3D fiber structures constituting non-rigid fiber preforms, the preforms can be made rigid by being consolidated by being partially densified.

With a non-rigid fiber structure (a non-rigid 1D, 2D, or 3D structure), it is advantageous to compact the fiber structure. Compacting can be performed at least in part by means of the flexible membrane during polymerization under pressure.

With a rigid fiber structure, a drain is advantageously placed between the fiber structure and the flexible membrane, and the resin contained in the drain is forced to penetrate into the fiber structure during final polymerization under pressure.

Either way, by the associated presence of a flexible membrane as a wall of the mold and of polymerization under pressure, the porosity of the composite material is thus reduced.

It is possible to use a mold having a rigid support part with a surface corresponding to the profile of one of the surfaces of the part that is to be made and against which the fiber structure is applied.

According to a particular feature of the invention, it is possible to perform pre-distillation treatment on the resin composition before it is injected into the mold in order to reduce the volatile material content therein to a value of less than 25% by weight.

The resin used is a polycondensation resin, such as a phenolic resin, in particular of the resol type, or a furanic resin. Solid fillers in finely-divided form may be added to the resin.

Advantageously, the polymerization step includes a initial stage during which the temperature is raised to a first value and suction is established within the mold in order to evacuate the volatile materials that are produced, and a final stage during which the temperature is raised progressively from the first value and the pressure is raised inside the enclosure in order to apply to the impregnated fiber structure a pressure that is preferably greater than 1 megapascal (MPa), e.g. lying in the range 1 MPa to 2.5 MPa.

Thus, the method of the invention is remarkable in that it constitutes adapting the RTM method specifically for making parts that are thick and of low porosity.

BRIEF DESCRIPTION OF THE DRAWINGS

The invention can be better understood on reading the following description given with reference to the accompanying drawings, in which.

DETAILED DESCRIPTION OF EMBODIMENTS OF THE INVENTION

A first step 10 of the method consists in preparing a fiber structure that is to constitute the reinforcement of a composite material part that is to be made. The fiber structure may be in the form of a three-dimensional (3D) fiber preform of a shape that corresponds to the shape of the part that is to be made, and itself presenting sufficient cohesion to enable it to be handled without losing its cohesion. In well-known manner, such a 3D fiber preform may be a felt or it may be obtained by three-dimensional weaving, knitting, or braiding, or by superposing two-dimensional (2D) plies and bonding them together. The 2D plies may be in the form of woven fabric, or of unidirectional (UD) sheets, or multidirectional sheets made up of a plurality of UD sheets superposed in different directions and bonded to one another. 2D plies can be bonded together by needling, stitching, or indeed inserting rigid elements or yarns through the plies.

By way of example, reference can be made to U.S. Pat. Nos. 4,790,052 and 5,226,217 which describe making 3D fiber structures of various possible shapes.

It is also possible to use a 3D stiffened fiber preform suitable for being manipulated while conserving its shape with the help of supporting tooling. Such a preform can be obtained by consolidating a non-rigid 3D fiber preform by depositing within the fiber preform material in a quantity that is just sufficient to bond the fibers of the preform to one another, i.e. pre-densification of the preform. This can be performed by chemical vapor infiltration (CVI) or by using a liquid technique, i.e. by impregnating the preform with a liquid precursor of the consolidation material, e.g. a resin, and transforming the precursor by heat treatment, while maintaining the shape of the fiber preform by tooling.

A rigid 3D fiber preform can also be obtained by superposing 2D plies, with the plies being bonded to one another by a binder that is organic (resin) or inorganic.

As mentioned above, it is also possible to use 1D fiber structures, e.g. obtained by merely winding a yarn, a tow, or a ribbon, or 2D fiber structures, e.g. obtained merely by draping 2D plies.

Figure 2:
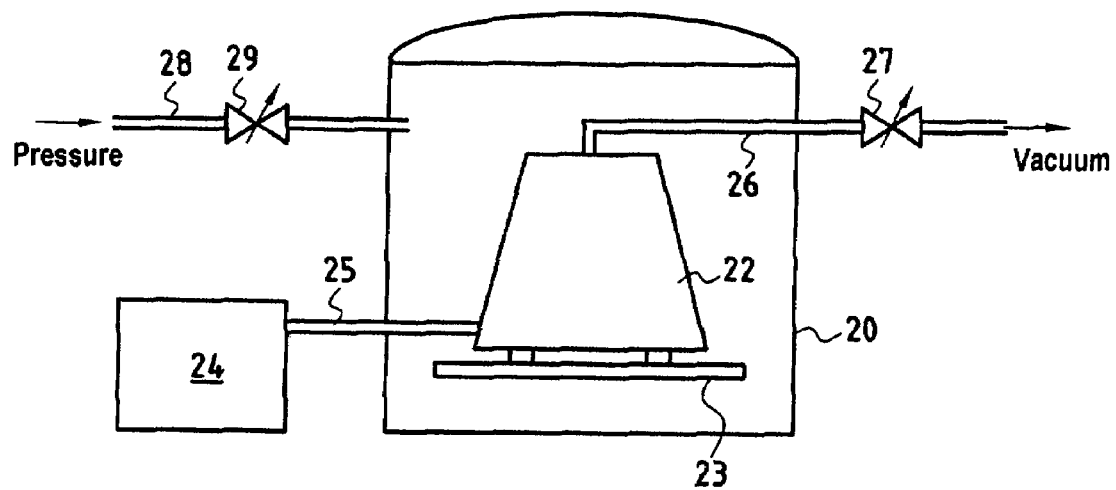
FIG. 2 is a highly diagrammatic overall view of an installation enabling a method of the invention to be implemented.

A second step 11 of the method consists in placing the fiber structure in a mold of a densification installation, e.g. of the kind shown in FIG. 2.

The installation comprises an enclosure 20 forming an autoclave having the mold 22 containing the fiber structure placed therein on a tray 23. Embodiments of the mold 22 are described below with reference to FIGS. 2 and 5.

A resin composition is introduced into the mold from an injection system 24 and a pipe 25 connecting the injection system to the mold 22, e.g. at the base of the mold. The injection system 24 comprises a tank and means for optionally heating and pressurizing the resin.

A pipe 26 connects the mold 22, e.g. the top portion thereof, to a vacuum source (not shown). A valve 27 mounted in the pipe 26 serves to establish or interrupt suction in the mold 12.

In addition, a pipe 28 connects the autoclave 20 to a source of gas under pressure, e.g. nitrogen (not shown). A valve and pressure-regulator assembly 29 is mounted in the pipe 28 to enable a higher pressure of desired value to be established or interrupted within the autoclave 20.

The autoclave 20 is also conventionally provided with heater means, e.g. of the resistive type, associated with temperature regulator means (not shown).

In the installation of FIG. 2, the resin is introduced via the base of the mold and rises progressively under the action of the suction established inside the mold by the connection to the vacuum source, possibly assisted by the resin being delivered at a higher pressure. Naturally, other dispositions are possible, by reversing the direction of flow of the resin through the mold or by injecting the resin into various different levels of the mold, in particular when the part that is to be made is of large dimensions.

Figure 3:
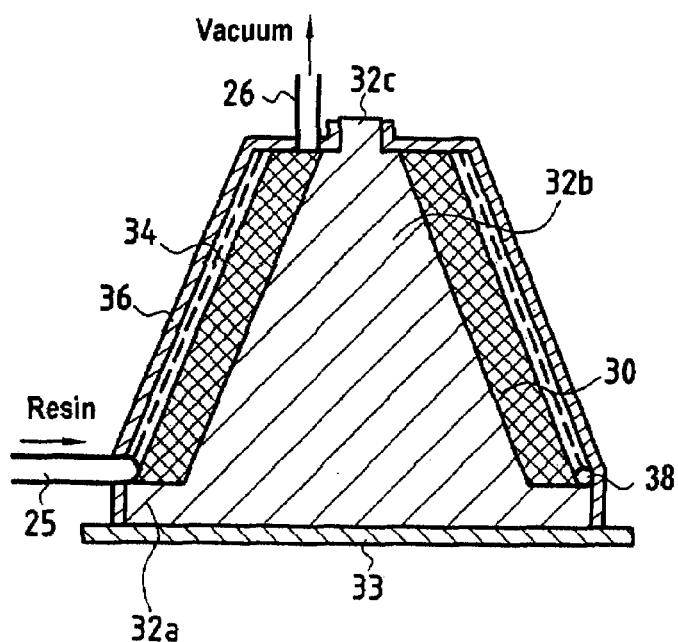
FIGS. 3 and 4 are diagrammatic views of embodiments of a mold for making a diverging portion of a rocket engine nozzle from a non-rigid fiber preform.
Figure 4:
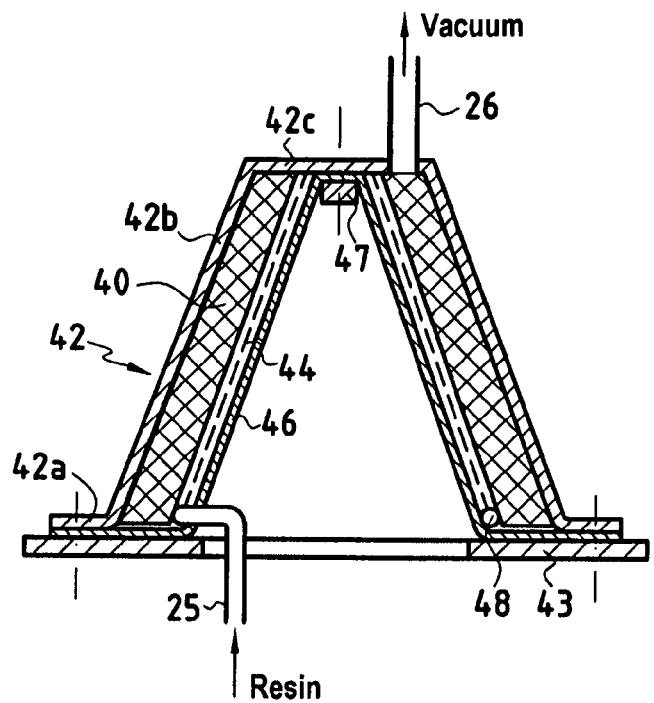
Figure 5:
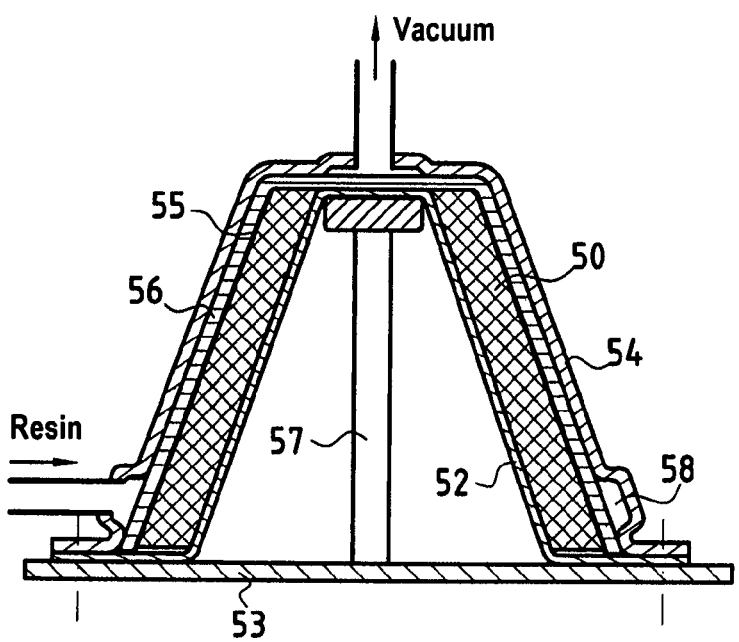
FIG. 5 is a diagrammatic view of an embodiment of a mold for making a diverging portion of a rocket engine nozzle from a rigid, consolidated fiber preform.

Molds that are suitable for annular fiber structures are shown in FIGS. 3 to 5, in an example relating to making a diverging portion for a rocket engine nozzle. The fiber structure is then preferably a 3D preform of carbon fibers made up of (woven or sheet) fiber plies that are superposed and bonded to one another by needling. The preform presents a shape that is circularly symmetrical and annular, frustoconical, or curved in profile, like an egg cup. Its dimensions vary depending on the dimensions of the diverging portion that is to be made. The thickness of the preform exceeds 5 cm and may be as great as 15 cm or even more.

Naturally, the shapes of the fiber structures and of the mold need to be adapted on each occasion to the shapes of the parts that are to be made.

The molds of FIGS. 3 and 4 are suitable for a fiber preform that has not been pre-densified, and that is therefore not rigid, also known as a "dry" preform.

The mold of FIG. 3 comprises a part or support tooling 32 having a base 32a resting on a support 33 and projecting in the form of a core 32b having an outside surface that is substantially frustoconical and of profile that corresponds to the profile of the surface that is to define the gas flow stream within the diverging portion of the nozzle that is to be made.

The preform 30 of the diverging portion that is to be made is substantially annular in shape and is placed on the core 32b with one axial end resting on the base 32a.

A resin diffusion drain 34 is placed on the outside surface of the preform 30, with the drain 34 being in the form of a grid, for example. The assembly is covered by a flexible leakproof membrane 36 made of elastomer, e.g. of silicone. The cover 36 is secured in leaktight manner by clamping collars around the base 32a and around an extension 32c at the top of the core 32b.

The pipes 25 and 26 are connected in leaktight manner to openings formed in the membrane 36 respectively level with the bottom and top portions of the core 32a.

A resin diffusion channel 38 extends around the bottom portion of the preform 30 and is fed with the resin by the pipe 25. By way of example, the channel 38 is constituted by a pierced tube.

The resin introduced via the pipe 25 spreads around the bottom portion of the preform in the channel 38 and progresses along the diffusion drain 34 so as to penetrate into the preform 30 from the drain. Excess resin is taken by the evacuation pipe 26 that is connected to an orifice formed in the membrane 36 at the top portion of the tooling 32.

FIG. 4 shows a mold comprising rigid support tooling 42 of female shape, unlike the tooling of FIG. 3. This tooling comprises a frustoconical portion 42b that is closed at its smaller-diameter top end 42c and that is provided with a collar 42a around its open bottom end. The inside face of the tooling corresponds to the profile that is desired for the outside surface of a diverging portion that is to be made.

The preform 40 of the diverging portion is placed against the inside surface of the frustoconical portion 42b of the tooling. A resin diffusion drain 44 is placed against the inside surface of the preform 40, the drain being in the form of a grid, for example. A flexible leakproof membrane 46 covers the drain 44, the membrane being made of elastomer, e.g. of silicone. The membrane extends continuously over the entire inside surface of the assembly formed by the tooling 42. At its periphery, it is held clamped in leaktight manner against the collar 42a and against a support 43. In its central portion, it is held clamped in leaktight manner between the top 42c of the tooling and a backing piece 47.

A resin diffusion channel 48 extends around the bottom portion of the preform 40 and is fed from the inside by the pipe 25. By way of example, the channel 48 is formed by a pierced tube.

The resin introduced by the pipe 25 spreads around the bottom portion of the preform, travels along the diffusion drain 44, and penetrates into the preform 40 through the drain. Excess resin is taken by the evacuation pipe 26 that is connected to an orifice formed in the top 42c of the tooling.

A mold suitable for a consolidated rigid 3D preform is shown in FIG. 5. The preform may be consolidated by depositing pyrolytic carbon (PyC) by CVI so as to bond the fibers to one another, the CVI deposition process and PyC themselves being well known.

The consolidated fiber preform 50 is enclosed in leaktight manner between inner and outer membranes 52 and 54, and it stands on a support 53. Leakproof elastomer membranes are used, e.g. made of silicone, and a delamination ply 55 and a drain fabric 56 are interposed between the preform 50 and at least the outer membrane 54.

As shown in FIG. 5, the membranes 52 and 54 are pressed against each other in leaktight manner at the support 53, and a rod 57 carried by the tray holds the inner membrane 52 pressed against the inside surface of the preform 50.

A resin diffusion channel 58 is formed around the bottom portion of the preform 50, under the membrane 54 and is connected in leaktight manner to the pipe 25. The resin introduced via the pipe 25 penetrates into the preform through the drain fabric 56 and the delamination ply 55. Excess resin is retained by the fabric 56 and by the pipe 26. The delamination ply 55 serves to facilitate unmolding after the resin has polymerized.

After the fiber structure has been put into place in the enclosure 20, the following step 12 consists in preparing the resin for injection into the mold 22.

The method of the invention is particularly suitable for making composite material parts having a matrix of a polycondensation resin, in particular a phenolic polycondensation resin. In particular, it is possible to use a phenolic resin of the resol type. The phenolic resins usually used in RTM processes have low viscosity. They are also delivered with a large amount of solvent as can be seen from their volatile material content, which content is relatively large, commonly about 40% by weight. During polymerization, the volatile material generates considerable porosity, about 15%.

Thus, according to a feature of the invention, a resin is injected that has a relatively low volatile material content, less than 25% by weight, and preferably less than 20%. The term volatile material is used herein to mean the solvent associated with the resin and the other materials that are exhausted in gaseous form during the polymerization cycle.

Depending on the volatile material content present in the available resin composition, it might be necessary to perform a pre-treatment operation in order to lower said content. Such pre-treatment consists in vacuum pre-distillation, while maintaining the resin at a moderate temperature. The temperature is selected to be high enough to achieve pre-distillation, but without triggering polymerization of the resin since that would impede its injection into the fiber preform that is to be densified. With phenolic resins, in particular of the resol type, the temperature is selected to lie in the range 60° C. to 90° C., for example.

In order to impart viscosity to the resin composition that is sufficiently low to enable thick fiber preforms for densification to be impregnated right through to the core, it might be necessary to heat the resin so as to raise its temperature up to a required level in order to achieve the desired viscosity. In general, the viscosity should lie in the range 0.1 Pa·s to 0.3 Pa·s, and should preferably lie in the range 0.1 Pa·s to 0.15 Pa·s. With phenolic resins of the resol type having a volatile material content of less than 25%, the temperature should preferably lie in the range 65° C. to 85° C., it being understood that the temperature must not exceed a threshold beyond which increasing viscosity of the resin prevents injection taking place.

The resin having the desired volatile material content and viscosity is injected into the mold 22 (step 13) using the injection system 24, which is adapted to deliver the resin composition at the desired temperature and possibly under pressure, e.g. at a pressure potentially up to 3 kilopascals (kPa). Simultaneously, the inside volume of the mold is evacuated by opening the valve 27. A counter pressure can be established in the autoclave 20 via the pipe 28 to balance pressure between the inside and the outside of the mold and to avoid the or each membrane thereof ballooning.

Figure 1:
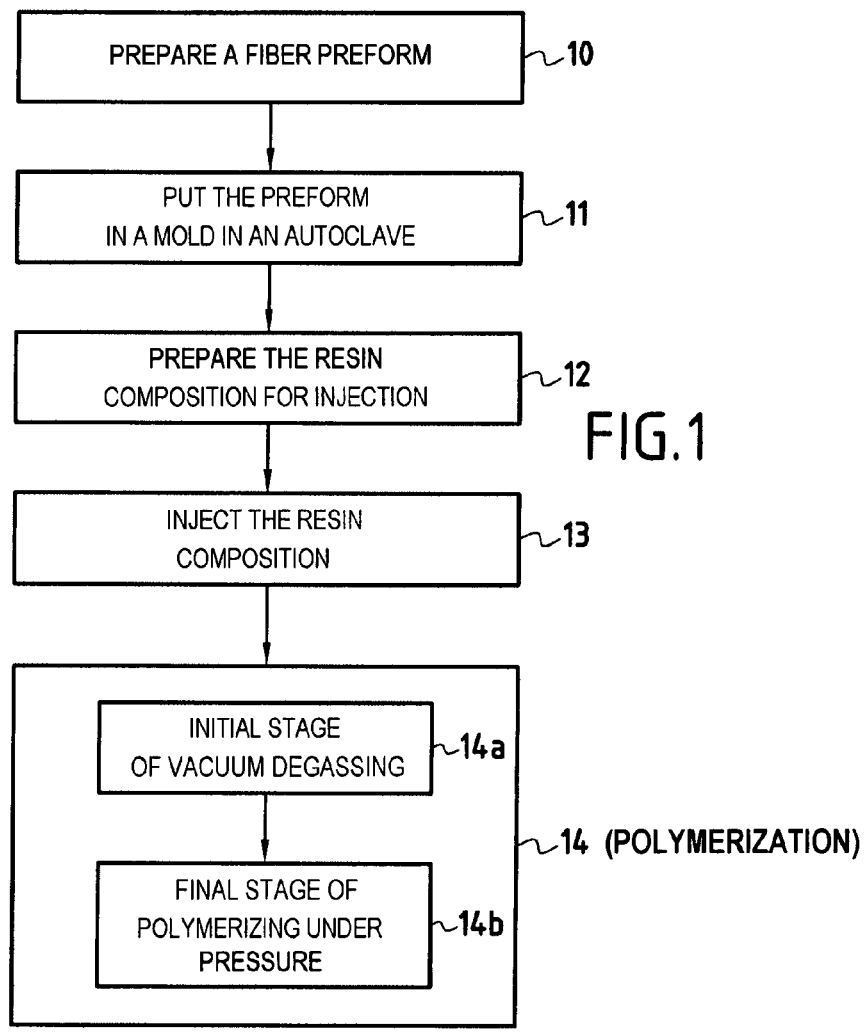
FIG. 1 shows the successive steps in an implementation of a method in accordance with the invention.
Figure 6:
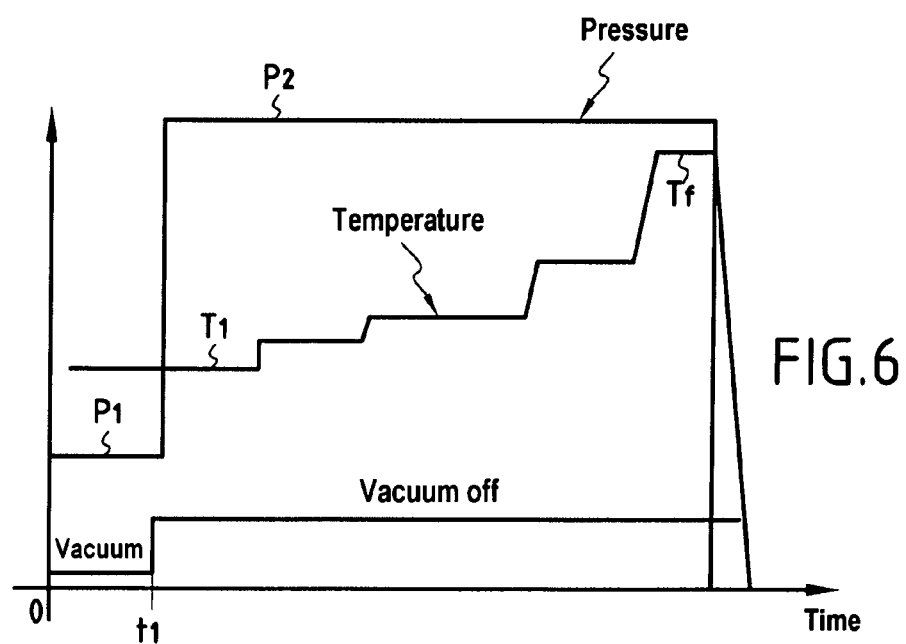
FIG. 6 shows how pressure and temperature vary during the step of polymerizing the resin in a particular implementation of the method in accordance with the invention.

After the resin has been injected, a step of polymerization within the mold 22 is performed (step 14). FIG. 6 shows an example of temperature and pressure variations within the mold and the autoclave during the polymerization cycle. Advantageously, the polymerization step comprises an initial stage 14a during which the temperature T in the autoclave 20 is raised to a level $T_1$ where it is maintained, and the mold 22 is maintained under a vacuum by opening the valve 27, the pressure $P_1$ in the autoclave 20 possibly being maintained equal to the surrounding pressure or equal to the counter pressure that is established during injection. The temperature is raised to a value $T_1$ that is sufficient to encourage degassing from the resin, i.e. evacuating the volatile material contained in the resin, while keeping the resin sufficiently fluid to enable it to continue to flow within the fiber preform and fill in the pores as the volatile material are evacuated via the pipe 26. With phenolic resins of the resol type, this temperature $T_1$ lies preferably in the range 65° C. to 85° C. The duration $t_1$ of the initial stage of vacuum degassing in the polymerization cycle is selected to enable sufficient volatile materials to be evacuated to obtain, after polymerization, a desired residual level of porosity in the resin matrix. This duration $t_1$ may last for several hours or several tens of hours.

Thereafter, a final stage 14b of polymerization under pressure is performed. To do this, the evacuation of the mold 22 is interrupted by switching off the vacuum, and then the autoclave 20 is pressurized and the temperature in the autoclave is raised progressively in steps up to a final polymerization temperature $T_f$.

The pressure $P_2$ in the autoclave is raised to a value that is relatively high, preferably greater than 1 MPa, e.g. lying in the range 1 MPa to 2.5 MPa. Under the effect of the pressure, the resin composition creeps into the residual pores within the fiber structure.

When the fiber shaft is not rigid, the pressure in the autoclave compresses the fiber structure, thus making it possible to obtain a composite material part that not only has small porosity, but that also has a fiber volume fraction that is increased relative to that to the fiber structure, the fiber volume fraction being the fraction of the apparent volume of the fiber structure or of the part that is occupied by the fibers.

It should be observed that the non-rigid fiber structure could also be compacted or pre-compacted at a stage prior to that of polymerization under pressure.

With a rigid fiber structure, the pressure in the autoclave allows the resin composition stored in the drainage fabric of the mold to be caused to creep into the fiber structure, thereby reducing its porosity.

The temperature $T_f$ depends on the type of resin composition that is used. Thus, with phenolic resins of the resol type, the temperature $T_f$ is preferably greater than 160° C.

Once polymerization is terminated, the heating of the autoclave is interrupted and the pressure within the autoclave is returned to atmospheric pressure.

In order to make it easier to fill in the pores of the fiber structure so as to reduce the residual porosity of the composite material part, it is possible to use a resin composition that contains solid fillers. The fillers must be in divided form and in limited quantity so as to avoid compromising injection of the fiber structure to its core. Thus, the percentage by weight of solid fillers should preferably be less than 10%. By way of example, it is possible to use carbon black.

Although carbon fibers are described as being used for making the fiber structure, it can readily be seen that fibers of some other kind could be used, such as organic or inorganic fibers, e.g. glass fibers or ceramic fibers (silica, alumina, . . . ).

In addition, the use of a polycondensation resin other than a phenolic resin is possible providing the steps of preparing the resin composition, injecting it into the mold, and polymerizing it can be implemented in a manner similar to that described above. Thus, it is possible to envisage using resins of the furanic type.

Tests have been carried out on dry 3D fiber preform samples made up of carbon fiber fabric plies superposed on a mandrel and bonded to one another by needling in order to make up fiber preforms of substantially frustoconical shape possibly reaching an axial length of 110 cm and an outside diameter of 200 cm.

A resol type phenolic resin composition was used that was pre-distilled to present a volatile material content of about 20% by weight. The resin composition was injected at a temperature of about 85° C. under a pressure of 0.2 MPa, with a vacuum being established within the mold.

The polymerization cycle comprises an initial phase of duration $t_1$ at a temperature in the range 65° C. to 85° C. with the mold being evacuated and without raising pressure in the autoclave, and a final stage under a pressure lying in the range 1 MPa to 2.5 MPa in the autoclave with temperature being raised in steps up to about 160° C.

For values of $t_1$ going from several hours to several tens of hours, the following were observed on the various resulting densified parts:

variation in relative density lying in the range 1.35 to 1.43;
variation in residual open porosity lying in the range 5.9% to 10%;
variation in the compacting ratio lying in the range 8% to 37%, where compacting ratio is the relative decrease in volume between the part as obtained and the fiber preform; and
variation in fiber fraction lying in the range 38% to 54%.

These tests confirm that it is possible using a method of the invention to densify thick fiber textures using an RTM type method while obtaining residual porosity that is small, less than 11%, and with it being possible, when using "dry" fiber textures, to achieve a fiber fraction that is quite high.

It should also be observed that by selecting a long duration $t_1$, i.e. a duration of several tens of hours, it is possible to obtain residual porosity that is small but that reduces the capacity for compacting and increasing the fiber fraction because of the greater viscosity of the resin at the end of the initial stage of the polymerization step.

Naturally, parts of dimensions larger than those of the parts made during the above-described tests can be fabricated.

The invention claimed is:

1. A method of making a thick part out of composite material comprising fiber reinforcement and a resin matrix, the method comprising the steps of:

providing a fiber structure that is to form the reinforcement of the part to be made;

placing the fiber structure in a mold having at least one wall that is formed by a flexible membrane;

injecting into the mold a resin selected from phenolic and furanic resins, having a volatile material content of less than 25% by weight and at a temperature of a value such that its viscosity lies in the range 0.1 Pa·s to 0.3 Pa·s; and polymerizing the resin in the mold placed in an enclosure with temperature being raised progressively, the polymerization step including an initial stage of only partial polymerization during which the temperature is raised to a first value and suction is established in the mold in order to evacuate produced volatile materials, and a final stage of polymerization during which the pressure is raised in the enclosure and the temperature is raised progressively from the first value up to a final polymerization temperature to complete polymerization under pressure, whereby a composite material part is obtained presenting a residual porosity of less than 11% by volume.

2. A method according to claim 1, in which a fiber structure is used comprising two-dimensional plies that are superposed and bonded to one another.

3. A method according to claim 2, in which the two-dimensional fiber plies are bonded to one another by elements extending through the plies.

4. A method according to claim 2, in which the two-dimensional fiber plies are bonded to one another by an organic or an inorganic binder.

5. A method according to claim 1, in which a non-rigid fiber structure is used and the fiber structure is compacted via the flexible membrane during the final polymerization stage under pressure.

6. A method according to claim 1, in which a rigid fiber structure is used, a drain is placed between the fiber structure and the flexible membrane, and the resin contained in the drain is forced to penetrate into the fiber structure during the final polymerization stage under pressure.

7. A method according to claim 6, in which a fiber structure is used that is stiffened by consolidation by partial densification.

8. A method according to claim 1, in which a mold is used comprising a rigid support portion having a surface corresponding to the profile of a surface of the part to be made and against which the fiber structure is applied.

9. A method according to claim 1, in which a pre-distillation treatment is performed on the resin composition before it is injected into the mold in order to reduce the volatile material content thereof to a value of less than 25% by weight.

10. A method according to claim 1, in which the resin composition also contains solid fillers.

11. A method according to claim 1, in which the final polymerization stage includes applying a pressure lying in the range 1 MPa to 2.5 MPa on the fiber structure.

12. A method of making a thick part out of composite material comprising fiber reinforcement and a resin matrix, the method comprising the steps of:
- providing a non-rigid fiber structure that is to form the reinforcement of the part to be made;
- placing the fiber structure in a mold having at least one wall that is formed by a flexible membrane;
- providing a resin composition selected from phenolic resins and furanic resins;
- performing a pre-distillation treatment on the resin composition in order to reduce the volatile material content thereof to a value of less than 25% by weight;
- injecting the pre-distilled resin composition into the mold at a temperature of a value such that its viscosity lies in the range 0.1 Pa·s to 0.3 Pa·s; and
- polymerizing the resin in the mold placed in an enclosure with temperature being raised progressively, the polymerization step including an initial stage of only partial polymerization during which the temperature is raised to a first value and suction is established in the mold in order to evacuate produced volatile materials, and a final stage of polymerization during which the pressure is raised in the enclosure and the temperature is raised progressively from the first value up to a final polymerization temperature to complete polymerization of the resin, with said non-rigid fiber structure being compacted via the flexible membrane during the final polymerization stage under pressure, whereby a composite material part presenting residual porosity of less than 11% by volume is obtained.

13. A method of making a thick part out of composite material comprising fiber reinforcement and a resin matrix, the method comprising the steps of:
- providing a rigid fiber structure that is to form the reinforcement of the part to be made;
- placing the fiber structure in a mold having at least one wall that is formed by a flexible membrane;
- placing a drain between the fiber structure and the flexible membrane;
- providing a resin composition selected from phenolic resins and furanic resins;
- performing a pre-distillation treatment on the resin composition in order to reduce the volatile material content thereof to a value of less than 25% by weight;
- injecting the pre-distilled resin composition into the mold at a temperature of a value such that its viscosity lies in the range 0.1 Pa·s to 0.3 Pa·s; and
- polymerizing the resin in the mold placed in an enclosure with temperature being raised progressively, the polymerization step including an initial stage of only partial polymerization during which the temperature is raised to a first value and suction is established in the mold in order to evacuate produced volatile materials, and a final stage of polymerization during which the pressure is raised in the enclosure and the temperature is raised progressively from the first value up to a final polymerization temperature to complete polymerization of the resin, with resin contained in the drain being forced to penetrate into the fiber structure during the final polymerization stage under pressure, whereby a composite material part presenting residual porosity of less than 11% by volume is obtained.

* * * * *